United States Patent [19]
Fuller et al.

[11] Patent Number: 5,893,152
[45] Date of Patent: Apr. 6, 1999

[54] METHOD AND APPARATUS THAT DETECTS AND TOLERATES INCONSISTENCIES BETWEEN THE CACHE AND MAIN MEMORY, AND THE TRANSLATION LOOKASIDE BUFFER AND THE VIRTUAL MEMORY PAGE TABLE IN MAIN MEMORY

[75] Inventors: Billy J. Fuller; Dale R. Passmore, both of Colorado Springs, Colo.

[73] Assignee: Sun Microsystems, Inc., Palo Alto, Calif.

[21] Appl. No.: 612,754

[22] Filed: Mar. 8, 1996

[51] Int. Cl.⁶ ..................................................... G06F 11/16
[52] U.S. Cl. ..................................... 711/141; 395/182.03
[58] Field of Search ..................................... 395/403, 455, 395/468–473, 416–418, 420, 182.08, 182.03; 371/10.2, 40.2, 40.11, 48; 711/3, 128, 141–146, 206–208, 220

[56] References Cited

U.S. PATENT DOCUMENTS

| | | | |
|---|---|---|---|
| 4,831,622 | 5/1989 | Porter et al. | 395/182.03 |
| 5,355,471 | 10/1994 | Weight | 395/182.08 |
| 5,386,527 | 1/1995 | Bosshart | 711/3 |
| 5,406,504 | 4/1995 | Denisco et al. | 711/119 |
| 5,692,153 | 11/1997 | Malik et al. | 711/141 |

OTHER PUBLICATIONS

Raghavan R., et al., "Multiprocessor System Verification through Behavioral Modeling and Simulation." Conference Proceedings of the 1995 IEEE 14th International Phoenix Conf. on Computers and Communications, 28–31 Mar. 1995:396–402.

Teller, P., "Translation–Lookaside Buffer Consistency," IEEE Computer, vol. 23, Iss: 6, (Jun. 1990): 26–36.

IBM Technical Disclosure Bulletin, vol. 38, No. 7, Jul. 1995, New York, pp. 97–99, "Coherency Monitor: System Coherency Protocol Verification Tool".

IBM Technical Disclosure, vol. 34, No. 4A, Sep. 1991, New York, pp. 355–357, "Linear–to–physical memory mapping by bus masters in virtual memory systems".

*Primary Examiner*—Eddie P. Chan
*Assistant Examiner*—Yamir Encarnación
*Attorney, Agent, or Firm*—James A. Pinto; William J. Kubida; Holland & Hart LLP

[57] ABSTRACT

Inconsistencies between cache and memory in a memory system operating in a computer are traced and corrected. A cache entry is checked against a counterpart memory entry to trace inconsistencies between the cache entry and the memory entry and to correct the cache entry. A page table entry in memory with a zero mapping mark is checked against a counterpart page entry in a translation lookaside buffer. Inconsistencies between the page table entry with a zero mapping mark and the existence of a counterpart page entry in the translation lookaside buffer is traced. The inconsistency is corrected by deleting the counterpart page entry in the translation lookaside buffer. Address mapping is checked comparing a page entry in the translation lookaside buffer against a counterpart page table entry in the memory. Inconsistencies between the page entry and the page table entry are traced and corrected.

12 Claims, 6 Drawing Sheets

15,893,152

METHOD AND APPARATUS THAT DETECTS AND TOLERATES INCONSISTENCIES BETWEEN THE CACHE AND MAIN MEMORY, AND THE TRANSLATION LOOKASIDE BUFFER AND THE VIRTUAL MEMORY PAGE TABLE IN MAIN MEMORY

BACKGROUND OF THE INVENTION

1. Field of the Invention

This invention relates to memory management software in a software system in a computer for the purpose of testing the software system's operability with the computer. More particularly, the invention relates to diagnosing cache management problems in a kernel of an operating system over a spectrum of selected workloads.

2. Description of Prior Art

In modern computers extensive use is made of cached memory in order to improve system performance. Exemplary memory architecture employs a Harvard cache and a Van Neuman memory. The Harvard designation applies to any memory management architecture in which instructions are stored separately from data. The Van Neuman designation applies to memory management architectures in which data and instructions are stored with data.

The memory provides what is known as virtual memory, when the effective range of addressable memory locations provided to a process is independent of the size of main memory. Most virtual memory schemes are hardware based. In these schemes the virtual address base is divided into fixed sized units termed pages. Virtual memory references are resolved to a page in main memory and an offset within that page.

There are several advantages to the use of virtual memory on computers capable of supporting this facility. Virtual memory allows large programs to be run on machines with main memory configurations that are smaller than the program size. As the program runs, additional sections of its program and data spaces are paged in to memory on demand.

A modern computer system environment with multiple caches for instructions, data and virtual memory mappings is susceptible to cache synchronization problems. There are two causes of cache synchronization error: inconsistencies between cache entries or between split caches, a.k.a. "aliasing"; and inconsistencies between physical memory management and cache memory management. These problems are difficult to detect.

Problems arise in instruction and data caches with a phenomenon known as address aliasing. In virtual memory systems the same physical address can be mapped to two or more completely different logical addresses. Aliasing occurs if both these logical addresses happen to be cached and a write cycle has occurred to one of them. The cache would update one cached copy of the physical address as well as the main memory itself but the cache copy of the other logical address would remain unchanged and would subsequently contain erroneous data.

Another instance of aliasing error can occur when a Harvard/split cache is being used. If for example the instruction cache and memory contained, for a given address, an old instruction, while the data cache contains an updated instruction, the caches would be out of synch. If the next memory access was directed to the same address, the instruction that would be uploaded would be the old, erroneous instruction.

The translation look-aside buffer (TLB) can also be out of synch with a page table entry. This can occur in one of two ways. An entry in the TLB may map to a page table entry for which there is no physical memory allocated. This can occur when there has been a context change and the TLB has not been flushed. Alternately, the TLB may contain physical page allocations that do not coincide with those in the page table. When this occurs the TLB is out of synch with the page table.

What is needed is a way to detect these problems when they occur.

SUMMARY OF INVENTION

In accordance with this invention, the above problem has been solved by correcting cache synchronization errors between cache and main memory in a computer through the following computer implemented steps. After detecting a memory access request, information entries, related to said memory access request, in both the cache and the main memory are compared. Those information entries determined to be in error are corrected. Also, memory access, or address, entries related to the memory access request that are in the main memory and in a memory management unit, are compared. Those memory access entries, that are in error, are corrected.

As a further feature of the invention, it is determined whether the memory access entries in the memory access request have been allocated memory space in main memory. If not, the memory access entries, related to the memory access request, are deleted from the memory management unit.

In another feature of the invention, a mismatch between the memory access entry in the main memory and in the memory management unit is detected. If there is a mismatch, the memory access entry in the memory management unit is corrected.

Correcting information entries is accomplished by writing from cache an information entry having a marker to a counterpart information entry in memory. The marker indicates the information entry has not updated a counterpart entry in main memory. After writing the information entry to main memory, any duplicate information entries in cache not having a marker are updated from the memory entry just written. Finally, the marker is cleared from the information entry in cache having the marker and any duplicate information entries in cache also marked with the marker.

As another feature of the invention, the location of information entry errors and memory access entry errors is traced.

In a machine implementation of the invention, apparatus for identifying and correcting inconsistencies between cache and memory in a memory system operating in a computer has a cache check module, a zero mapping check module and an address mapping check module. The cache check module checks a cache entry against a counterpart memory entry to trace inconsistencies between the cache entry and the memory entry and to correct the cache entry. The zero mapping check module checks a page table entry with a zero mapping mark in memory against a counterpart page entry in a translation lookaside buffer. This module traces inconsistencies between the page table entry with a zero mapping mark and the existence of a page entry in the translation lookaside buffer. The inconsistency is corrected by deleting the page entry in the translation lookaside buffer. The address mapping check module checks a page entry in the translation lookaside buffer against a counterpart page table entry in the memory to trace inconsistencies between the page entry and the page table entry. The page entry is corrected if necessary. These three modules trace and correct inconsistences in the cache, the memory and the translation lookaside buffer.

The cache check module has a detecting module detecting a mismatch between a cache entry and a counterpart entry in memory, a trace module tracing the location of the mismatch detected by said detecting module and a correction module correcting the cache entry and the counterpart entry in memory so that both entries match. In a write back protocol the correction module has a write module, an update module and a clear module that operate as follows. The write module writes a cache entry marked with a dirty marker to a counterpart entry in memory, the dirty marker indicates the cache entry has not yet been written to a counterpart entry in memory. Thereafter, the update module writes the counterpart entry from memory to any duplicate cache entries not having a dirty marker. This updates all the cache entries that are duplicate entries for the cache entry marked with a dirty marker. Finally, the clear module clears the dirty marker from the cache entry marked with the dirty marker and any duplicate cache entries also marked with the dirty marker.

As a further feature of the invention the zero mapping check module has a page entry detector detecting if there is a page entry in the translation lookaside buffer for the memory access request. A search module retrieves a counterpart page table entry in memory for the page entry in the translation lookaside buffer. A test module tests the counterpart page table entry for a valid mark and produces a zero mapping indicator for the counterpart page table entry if the valid mark is absent. A trace module traces the identification of the page entry and counterpart page table entry if said test module produces the zero mapping indicator for the counterpart page table entry. A delete module deletes the page entry if said test module produces the zero mapping indicator for counterpart page table entry.

The address mapping check module has a comparing module, responsive to a valid mapping indicator from the above test module. The comparing module compares the page entry from the translation lookaside buffer to the counterpart page table entry in memory and provides a mismatch indication if the page entry does not match the counterpart page table entry. A trace module, responsive to the mismatch indication, traces the identification of the page entry and counterpart page table entry that do not match. An upload module, responsive to the mismatch indication, updates the page entry in the translation lookaside buffer with the counterpart page table entry in the memory.

Computer implemented steps in another implementation of the invention are provided as an article of manufacture, i.e. a computer storage medium containing a computer program of instructions for performing the above described steps or module functions.

The invention is particularly useful in testing the operability of complex kernel systems, such as those systems operating in a UNIX environment. A kernel system tested and debugged with the present invention is very likely to have a very low error rate when testing is completed.

The great utility of the present invention is that it allows for the detection and correction of cache synchronization problems in complex systems in which millions of operative situations may need to be tested in order to encounter a synchronization problem.

The great advantage of this invention is that complex software systems may be tested by the computer system in a reasonable amount of time, and the test is well balanced to produce a high quality software system product.

The foregoing and other useful features and advantages of the invention will be apparent from the following more particular description of a preferred embodiment of the invention as illustrated in the accompany drawings.

DETAILED DESCRIPTION OF PREFERRED EMBODIMENTS

The embodiments of the invention described herein are implemented as logical operations in a distributed processing system having client and server computing systems. The logical operations of the present invention are implemented (1) as a sequence of computer implemented steps running on the computing system and (2) as interconnected machine modules within the computing system. The implementation is a matter of choice dependent on the performance requirements of the computing system implementing the invention. Accordingly, the logical operations making up the embodiments of the invention described herein are referred to variously as operations, steps or modules.

Cache synchronization problems in either the information cache or memory mapping cache need to be detected and corrected before each memory access request is processed. The current invention involves the use of specific diagnostic checks and correction procedures operating in the computing system shown in FIG. 1. As each memory access request is detected, a check and correction is performed on the information cache, i.e. an instruction cache and a data cache. There are two levels to the check. First, since the information cache is a logical cache, and a logical cache may contain more than one virtual entry for each physical address, an internal check is performed. The internal check assures that all virtual entries contain identical data so that whichever is provided in response to the memory access will be correct. Second, since cache and main memory may be out of synch, i.e. with the cache containing stale or inconsistent data, a comparison of cache to main memory is also performed. Finally, a comparison of memory mapping in the memory cache and main memory is performed to make sure that the memory mapping in cache corresponds with the actual mapping in the main memory. These checks and corrections can be performed transparently while maintaining system operability.

Figure 1:
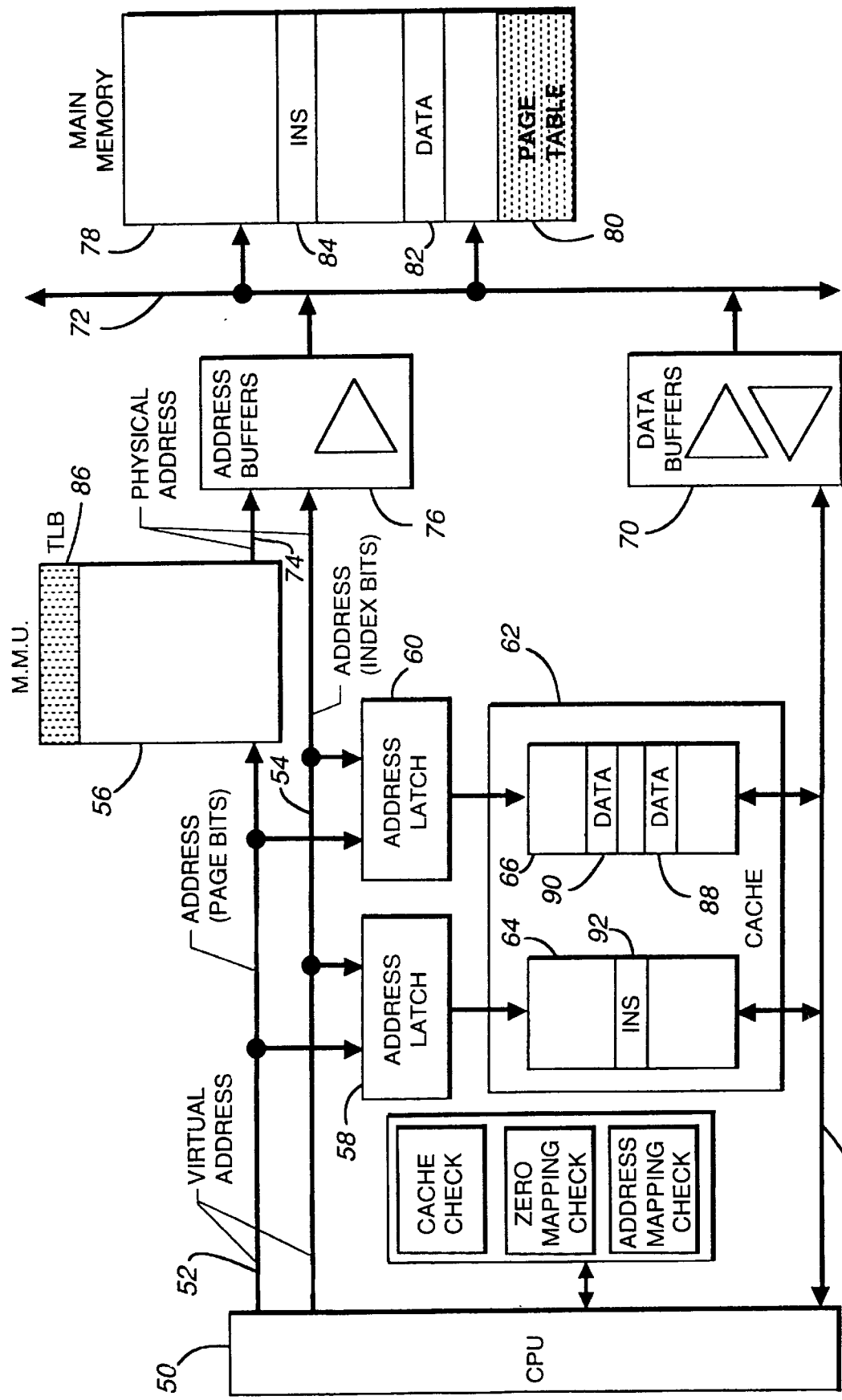
FIG. 1 illustrates a computing system having a local and system bus with associated cache and main memories for performing the logical operations of a preferred embodiment of the invention.

In a preferred embodiment of the invention shown in FIG. 1, CPU 50 is shown connected to a local bus comprised of address lines 52, 54 and data line 68. A virtual address consists of upper or page bits and lower or index bits. The upper address bits of CPU 50 are output on address line 52 and the lower address bits on line 54. Upper address bit line 52 is connected to a memory management unit (MMU) 56. Additionally, virtual address lines 52, 54 are connected to address latches 58, 60 which address a logical cache unit 62 known in this architecture as the Virtual Address Cache (VAC). Logical cache unit 62 is comprised of a instruction cache 64 for storing recently used instructions and a data cache 66 for storing recently used data. Because this cache unit 62 resides upstream on the CPU side of MMU 56, it is referred to as a logical cache. Addresses upstream of the MMU are all logical or virtual addresses, and the addresses downstream are physical addresses. If the cache unit resided downstream of the MMU, it would be referred to as a physical cache.

Both the instruction cache 64 and the data cache 66 are connected to the local data bus 68 which bus is connected to CPU 50. Data bus 68 is connected by means of data buffer 70 to system bus 72. The translated or mapped page bits 74 are output from MMU 56 to address buffer 76 in combination with index bits to provide a complete physical address to the system bus 72. System bus 72 connects to main memory 78.

Main memory 78 contains a page table 80. The page table contains one entry for each physically configured page of memory. (A page is a fixed unit of measure used to divide a physical or virtual address space.) Each Page Table Entry (PTE) describes the location and the current state of its associated page as the system manipulates it. These structures allow the kernel to maintain information as to the MMU mapping or translation of every virtual address to a physical page of memory. By way of example, page 82 is a page containing data and page 84 is a page containing instructions in main memory.

In order to maintain high performance levels, a redacted copy of the page table is kept in a cache in the MMU 56 and is called the Translation Lookaside Buffer (TLB) 86. Since there may be several levels of page tables mapping different regions of address space, several memory references may be required to fetch the contents of a virtual address. As this process would be prohibitive if it were required on each memory reference, a hardware cache of PTEs, the TLB, is maintained. When an address translation is performed by MMU 56, the TLB 86 is checked for a matching entry. If the required translation is not already in TLB, it is fetched and is placed in the TLB, possibly displacing an older entry.

Data and instructions are also cached. Data cache 66 contains one or more copies 88, 90 of recently accessed data 82 stored in main memory. Instruction cache 64 contains one or more copies 92 of recently accessed instructions 84 stored in memory.

Figure 2:
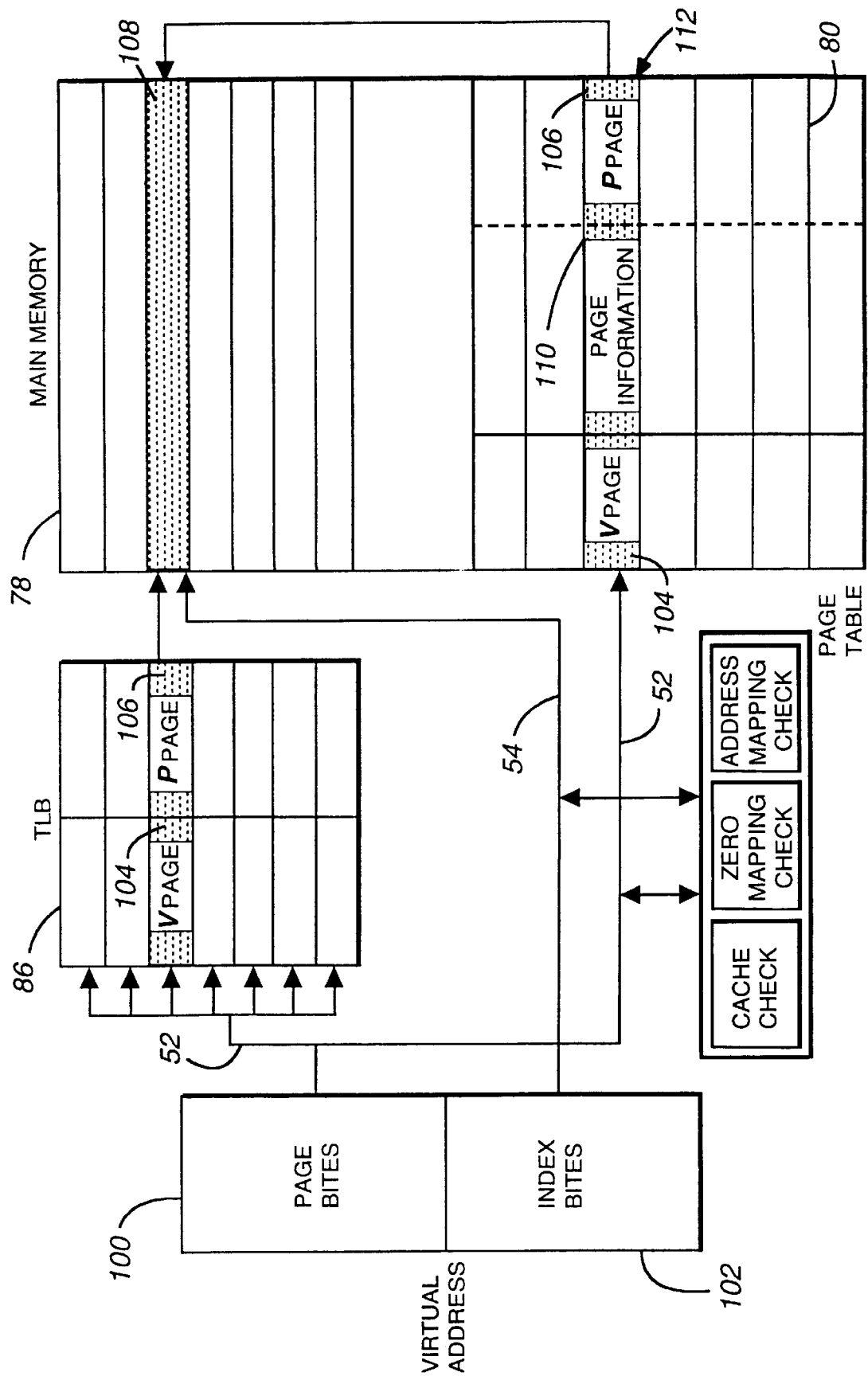
FIG. 2 shows the flow of addresses involved in memory management and the mapping of virtual addresses.

In FIG. 2 the components connected with a virtual to physical address translation process are shown. As a computer process runs, it references code and data by using virtual addresses that are transparently translated to physical addresses. In order to map a virtual address to a physical memory address, a mapping function is provided by MMU 56. It takes a virtual address and applies it to an address map to yield the physical address. A virtual address consists of two parts: a virtual page number 100 comprising the page bits or upper address bits and an offset within that page comprising the lower address bits known as the index bits 102 or offset. The virtual page number and offset must be converted to a physical page number and offset at run time.

Using a combination of software and hardware techniques, page bits in the virtual address point to a virtual page number 104 in a page table 80 or in the TLB 86. In either table the virtual page number 104 yields a physical page number 106 corresponding to a page 108 in memory. This physical page number 106 is then combined with the offset 102 to produce a real address in physical memory. The virtual addressing scheme allows the virtual address space to be larger than the physical address space.

A record of each of these mappings is maintained in one or more page tables 80. Shown in FIG. 2 is a page table having an entry 112. The entry contains for each virtual page 104 the corresponding physical page 106. This is the same information held in the TLB for recently accessed addresses. In addition, each PTE contains information 110 as to access rights, last access, and a valid bit. This latter bit indicates whether or not physical memory has been allocated for this page. Physical pages are not always available for every virtual address reference. If the valid bit is off, main memory has not been allocated for the page. If the hardware attempts to translate an address through a PTE that has a valid bit off, a page fault is generated.

Figure 3:
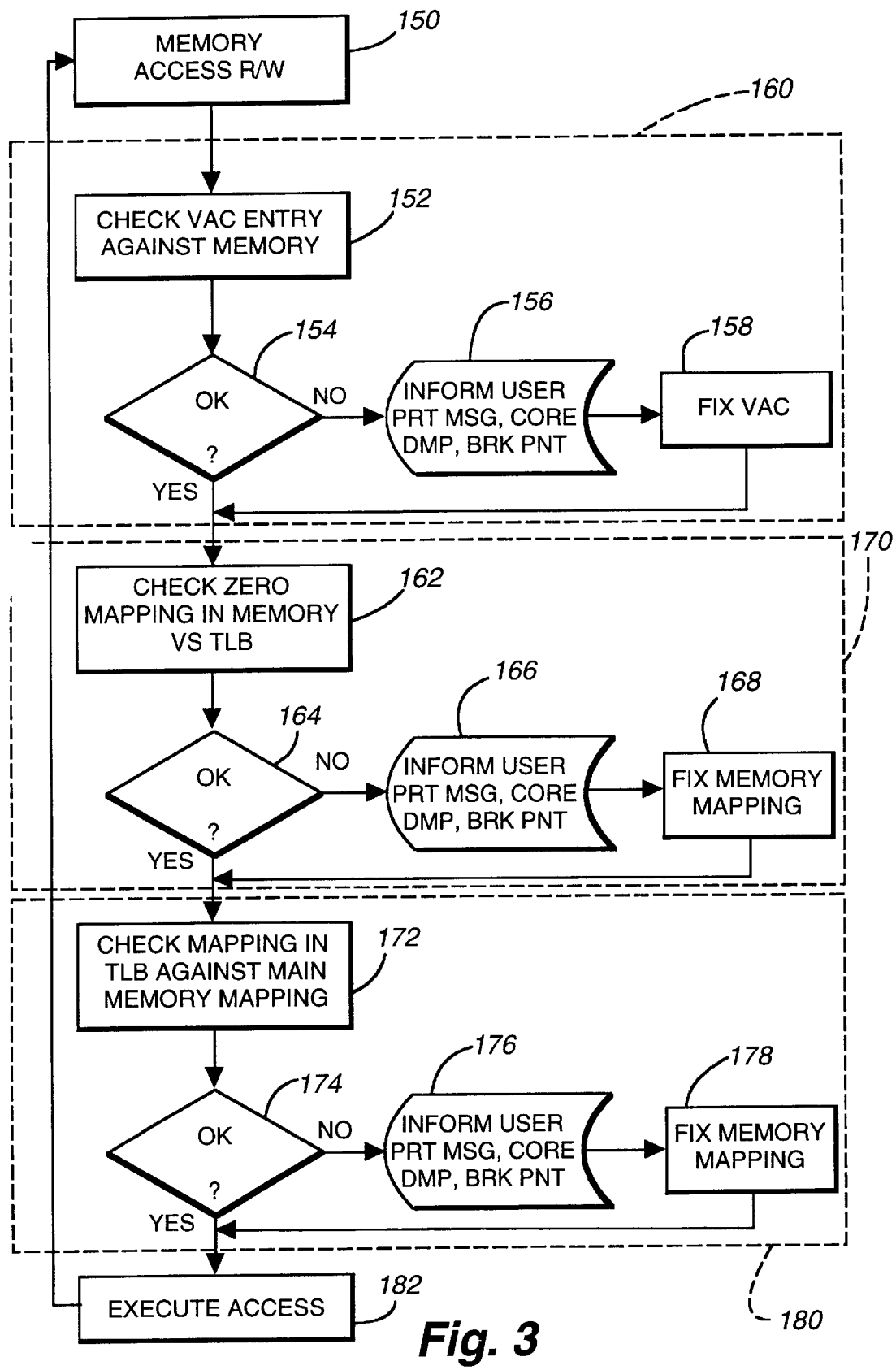
FIG. 3 shows the overall flow of logical operations or process steps that are fundamental to the preferred embodiment of the invention.

FIG. 3 is a logical operation flow diagram according to a preferred embodiment of the current invention for handling cache self-checking and correcting in a computing system such as is shown in FIG. 1 and FIG. 2. The logical operations begin at memory access operation 150 which detects a memory access store(write)/load(read). When there is such an access operation, operation 152 checks the instruction and data contents of the virtual address caches 64, 66 are checked against instruction and data contents for the same entries in memory 78. In decision process 154, a determination is made as to whether that above-mentioned check was successfully executed, i.e. the instruction and data contents match. In the event that answer is in the negative, then control passes to tracing step 156 in which, at the user's direction one of three error tracing actions may be taken. A message may be printed indicating that an error has been found while the program continues to execute in a non-interrupted fashion. Alternatively, a break point may be introduced into the execution of this diagnostic operation flow, and control of the computer system is returned to the user. Last, a core dump may be executed at the time that the contents of the VAC were found to be in error and then operation flow resumes after the core dump. In operation 158, the inconsistency found in the VAC is corrected by rewriting the contents of the VAC. Operation flow then passes to operation 162. Logical operations 152–156 constitute the VAC checking and correcting portion 160 of the diagnostic operation flow.

If the VAC entry is consistent with the memory entry, the operation flow branches "yes" from decision operation 154 to operation 162. Operation 162 checks zero mappings in the page table in main memory versus the contents of the TLB pertaining to the virtual memory address being accessed by operation 150. A zero mapping is a page table entry that has been marked as deallocated or invalid. The TLB should not have a entry corresponding to a page table entry that has been deallocated. If decision operation 164 detects an error in the TLB, i.e. the TLB contains a virtual page number entry that was zero mapped in the page table entry in memory, then control passes to trace module 166. Trace module 166 provides the same alternative tracing operations as described above for operation 156. After the tracing operation, correction module 168 corrects the TLB by eliminating page number entries which had been found at a Page Table level not to have been allocated physical memory. Logical operations 160–168 constitute the zero memory checking and correcting portion 170 of the diagnostic.

Finally control passes to operation 172, in which the actual mappings in the TLB for the specific memory access are checked against the corresponding entries in the Page Table(s) 80 in main memory 78. If decision operation 174 detects there are inconsistencies between the TLB entry and the page table entry connected with this memory access, then trace module 176 provides the error tracing alternatives described above for operation 156. Subsequently, correction module 178 corrects the TLB entry to match the page table entry in main memory 78. Logical operations 170–178 constitute the TLB-PTE checking and correcting portion 180 of the diagnostic. If decision operation 174 detects the TLB entry matches the page table entry, the operation flow branches "yes" to execute access operation 182. Operation 182 resumes the processing of the store/load command connected with the current memory access.

Figure 4A:
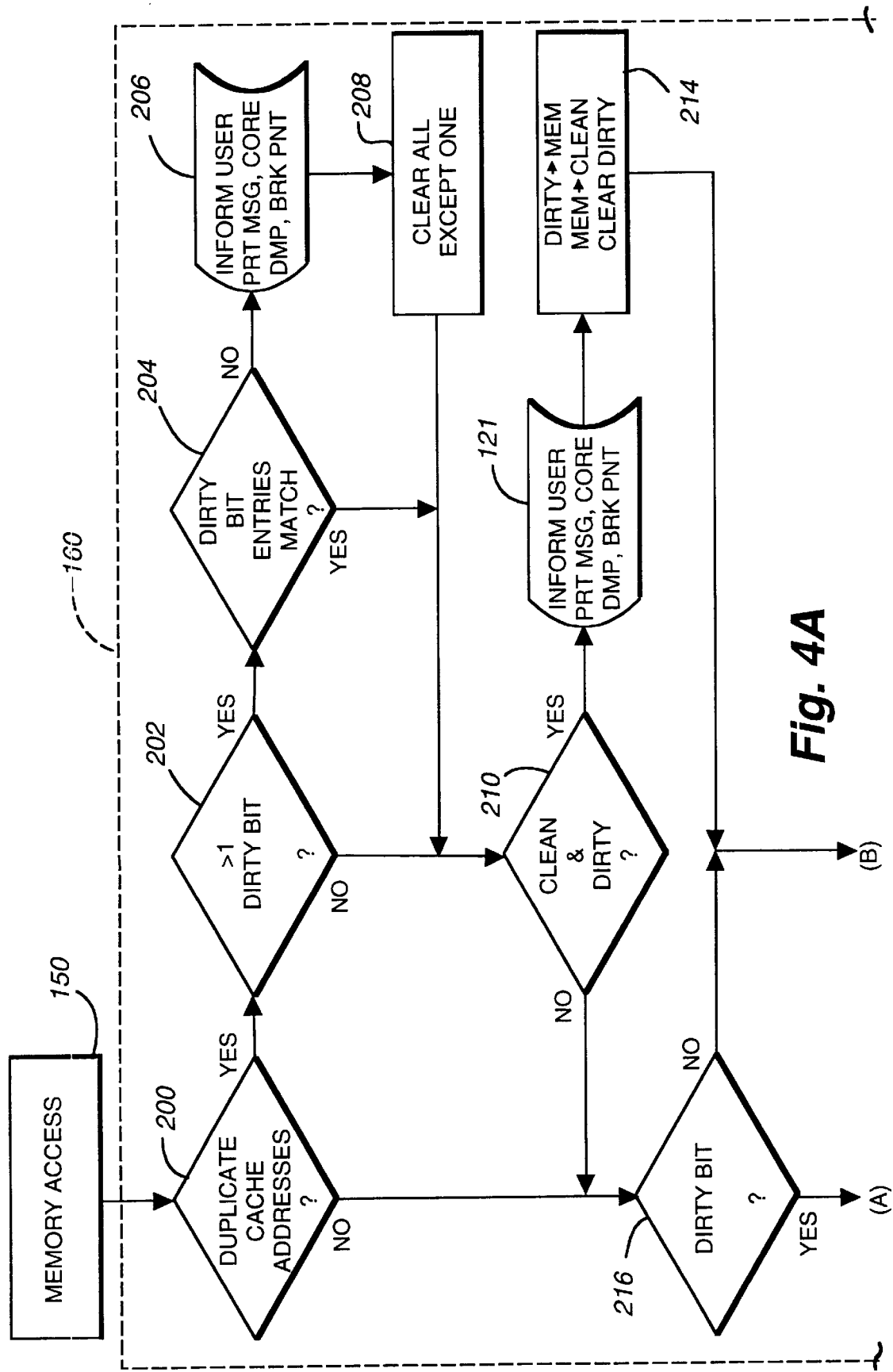
FIG. 4, consisting of FIGS. 4A and 4B, shows in greater detail the flow of logical operations connected with checking VAC entries against memory as referred to in FIG. 3.
Figure 4B:
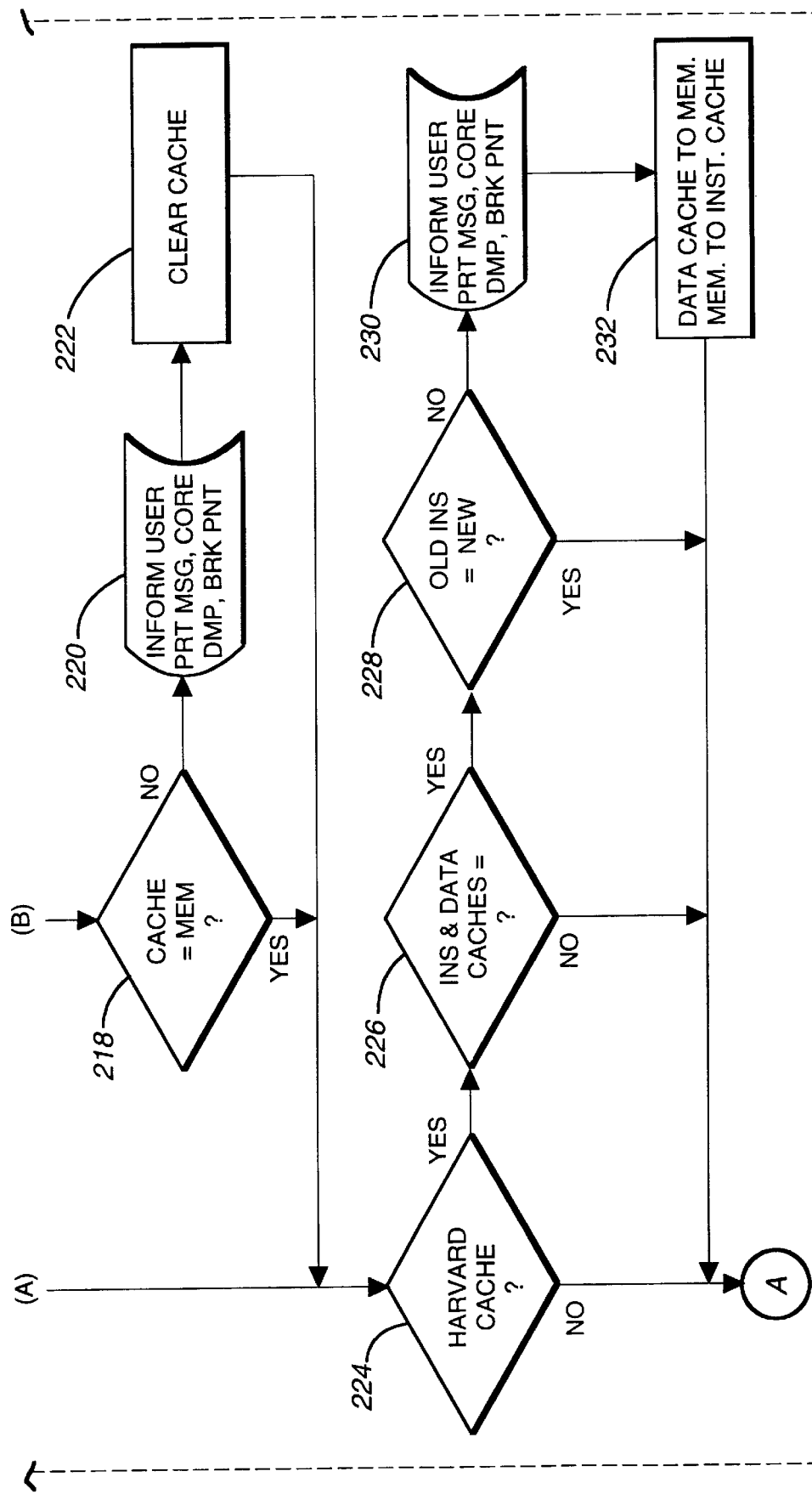

FIG. 4 shows in greater detail the logical operation flow 160 (FIG. 3), the checking and correcting of the virtual address cache against memory. Decision operation 200 tests whether there are a plurality of duplicate entries for the address, with respect to which a memory access is being made, in either the data cache 64 or the instruction cache 66.

In the event that a determination is made that there are duplicate entries in cache for the same virtual address, control is passed to decision step 202. Step 202 detects whether more than one of the plurality of duplicate entries contains a dirty bit mark. A dirty bit is utilized in a write back cache protocol to indicate data in cache which has not yet been written to main memory.

In the event that there is more than one cache entry containing a dirty bit, control is passed to decision step 204, in which a determination is made as to whether the entries containing the dirty bits have matching data in the case of cache 64 or matching instructions in the case of instruction cache 66. In the event the entries do not match, control is passed to tracing step 206 in which the above-described alternative trace operations are presented to the user. Thereafter operation 208 deletes all except one of the cache entries pertaining to the address being accessed and containing a dirty bit. Subsequently, control passes to decision operation 210. Also, if the dirty bit entries do match or if there is only one or no dirty bit entry, control passes from decision operations 204 and 202, respectively, to decision operation 210.

In decision step 210 a determination is made as to whether the cache locations pertaining to this memory access request contain a mix of cache entries, some clean and some with dirty bit marks. If the plurality of cache entries are all clean or are all marked dirty, the operation flow branches "no" from decision operation 210 to decision operation 216. In the event that there is a mix of cache entries—some dirty and some clean—, control is passed to tracing step 212, in which the above-mentioned alternative trace operations are performed. Thereafter, correcting operation 214 pushes a cache entry tagged with a dirty bit to an entry in physical memory and in turn uploads that entry in physical memory back to all clean entries in cache for that virtual address to update those duplicate cache entries. Then, the dirty bit is cleared from the cache entry or matching cache entries that were marked as dirty. Such dirty entries are now clean since they now match their counterpart entry in physical memory. This correction operation assures that this memory access will not fetch stale data from the cache. Stale data is data which has not been updated.

From correction module 214 the operation flow passes to decision operation 218. Decision step 218 can be reached by more than one path. Subsequent to a determination in decision step 200 that only one cache entry exists for the current memory access, control passes to decision step 216. Also if decision operation 210 detects that all duplicate entries for the access request are either all dirty or all clean, control passes to decision operation 216. Decision operation 216 detects whether any cache entry reaching operation 216 is tagged with a dirty bit. If it is not, then control is passed to decision operation 218. This process assures that all clean entries in the case of a write-back cache protocol or all entries in the case of a write-through cache protocol are self-consistent and consistent with main memory.

In the event a determination in decision step 218 is made that all the cache entries matching the memory access address do not contain the same data/instructions as does the counterpart entry in main memory, then control is passed to trace reporting step 220. In step 220 the user is presented with the alternative tracing operations. Subsequently control passes to correction operation 222 in which all entries in cache for this memory access address are cleared. The entries are cleared since they are inconsistent with counterpart entries in memory and are not tagged with a dirty bit. Control then passes to decision operation 224. This is the same decision operation reached by decision operation 216 if it is determined that a single cache entry is present and is tagged with a dirty bit.

Figure 5:
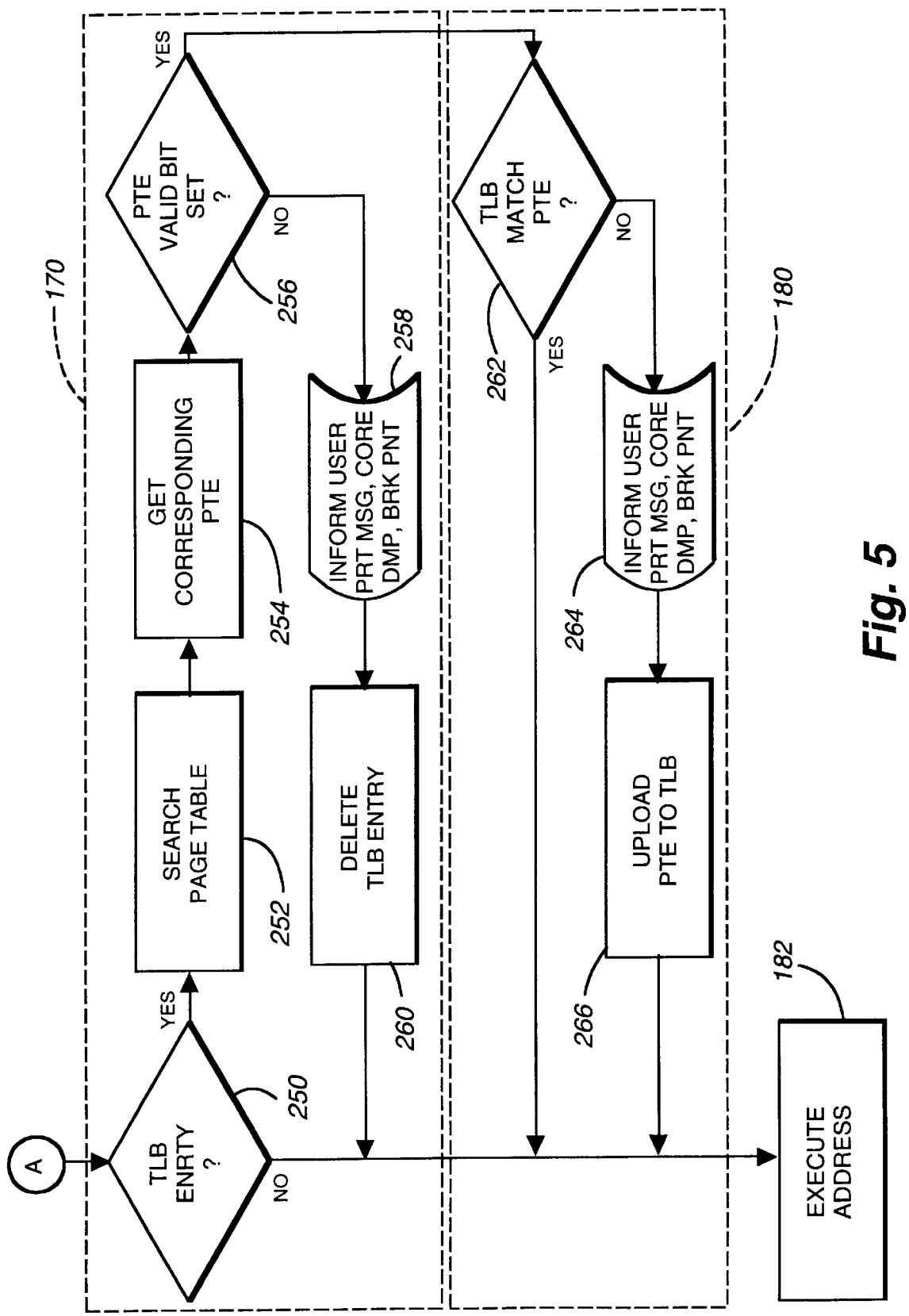
FIG. 5 shows in greater detail the flow of logical operations connected with checking TLB entries against page tables in physical memory as referred to in FIG. 3.

Decision operation 224 determines whether the cache(s) operate as Harvard/split caches where one cache contains only instructions and the other cache contains only data. If this determination is in the affirmative, the operation flow branches to decision operation 226. Decision operation 226 detects whether both the instruction cache and the data cache contain an entry for the current memory access address. If this is the case, then it is important that the two entries match. If they do not, this indicates that the instruction has been updated, and the new version of the instruction is in the data cache. The old version of the instruction is in the instruction cache. Decision operation 228 detects that the entries do not match. If there is no match, control is passed to trace module 230 in which one of the alternative tracing operations is performed. Subsequently control passes to correction module 232. Correction module 232 pushes the instruction contained in the data cache to the memory address corresponding to the memory access request. This updates the instruction resident at that address in main memory. Then the updated instruction is fetched into the instruction cache to update the instruction in the instruction cache. Control subsequently passes to decision operation 250 (FIG. 5). Connector 234 is also reached if there is no Harvard cache, or no same address entries in the instruction and data caches or if the same address entries having matching contents, i.e. from decision operations 224, 226 and 228, respectively.

FIG. 5 shows in greater detail the operations 170, 180 shown generally in FIG. 3, namely checking zero mappings in memory against TLB entries and comparing mappings in main memory to mappings in the TLB. Decision step 250 detects whether there is a TLB entry corresponding to the current memory access. In the event that there is none, control passes to step 182 to execute the access request. In the event that there is a TLB entry, control passes to search operation 252. Operation 252 searches the page table 80 to find the page table entry (PTE) corresponding to the virtual address in the current memory access request. This search may involve several levels of page tables depending on the segmentation of physical memory. In FIG. 1 and FIG. 2 only one page table 80 is shown.

When the PTE is located, it is fetched in step 254 and checked in decision step 256 to see if the valid bit is set. The valid bit being set indicates that physical memory has been allocated for this PTE entry and the counterpart TLB entry. In the event decision operation 256 detects that a physical address in main memory has not been allocated, then control is passed to trace module 258. Trace module 158 executes one of the alternative error tracing operations as selected by the user. Control then passes to process step 260, in which the TLB entry corresponding to the memory access is deleted since the physical address in main memory has not been allocated.

Alternately, if in decision step 256 a determination is made that the TLB entry has been allocated physical memory, i.e., that the valid bit has been set, then control is passed to decision operation 262. Operation 262 detects whether the TLB entry matches the Page Table entry. In other words, that the context is the same, that the update status is the same, and the physical address is the same. If the TLB entry matches the PTE, control passes to operation 182 for resumption of processing connected with the current memory access request. If the TLB entry does not match the PTE, control is passed to trace module 264, in which one of the error tracing operations is performed. Thereafter, control passes to correction module 266, in which the PTE [or in the event of a multi-level Page Tables, the Page Table Pointer entry (PTP)] is uploaded to its counterpart in the TLB to update the TLB. Finally, control is passed to process 182 for resumption of activity connected with executing the current memory access.

While the invention has been particularly shown and described with reference to a preferred embodiment thereof, it will be understood by those skilled in the art that various other changes in the form and details may be made therein without departing from the spirit and scope of the invention.

What is claimed is:

1. Apparatus for identifying and correcting inconsistencies between cache and memory in a memory system operating with a computer processor, the memory system having a memory cache, a memory and a translation lookaside buffer, said apparatus comprising:

cache check module checking a cache entry against a counterpart memory entry to trace inconsistencies between the cache entry and the memory entry and to correct the cache entry;

zero mapping check module checking a page table entry with a zero mapping mark in memory against a counterpart page entry in the translation lookaside buffer to trace inconsistencies between the page table entry with a zero mapping mark and the page entry in the translation lookaside buffer and to correct the page entry in the translation lookaside buffer;

address mapping check module checking a page entry in the translation lookaside buffer against a counterpart page table entry in the memory to trace inconsistencies between the page entry in the translation lookaside buffer and the page table entry in memory and to correct the page entry in the translation lookaside buffer, whereby inconsistencies in the cache, the memory and the translation lookaside buffer are traced and corrected.

2. The apparatus of claim 1 wherein said cache check module comprises:

detecting module detecting a mismatch between a cache entry and a counterpart entry in memory;

trace module tracing the mismatch detected by said detecting module;

correction module correcting the cache entry and the counterpart entry in memory so that both entries match.

3. The apparatus of claim 2 wherein said cache uses a write back protocol and said correction module comprises:

a write module writing a cache entry marked with a dirty marker to a counterpart entry in memory, said dirty marker indicating the cache entry has not yet been written to a counterpart entry in memory;

update module updating any duplicate cache entries not having a dirty marker and being duplicate entries for the cache entry marked with a dirty marker;

clear module clearing the dirty marker from the cache entry marked with the dirty marker and any duplicate cache entries also marked with the dirty marker.

4. The apparatus of claim 1 wherein each of said cache check module, said zero mapping check module and said address mapping check module are operative in response to a memory access request.

5. The apparatus of claim 4 wherein said zero mapping check module comprises:

page entry detector detecting if there is a page entry in the translation lookaside buffer for the memory access request;

search module retrieving a counterpart page table entry in memory for the page entry in the translation lookaside buffer;

test module testing the counterpart page table entry for a valid mark and producing a zero mapping indicator for the counterpart page table entry if the valid mark is absent;

trace module tracing the page entry and counterpart page table entry if said test module produces the zero mapping indicator for the counterpart page table entry; and delete module deleting the page entry if said test module produces the zero mapping indicator for counterpart page table entry.

6. The apparatus of claim 5 wherein said address mapping check module comprises:

said test module producing a valid mapping indicator if the valid mark for the counterpart page table entry is present;

comparing module, responsive to the valid mapping indicator from said test module, comparing the page entry from the translation lookaside buffer to the counterpart page table entry in memory and providing a mismatch indication if the page entry does not match the counterpart page table entry;

trace module, responsive to the mismatch indication, tracing the identification of the page entry and counterpart page table entry that do not match; and upload module, responsive to the mismatch indication, updating the page entry in the translation lookaside buffer with the counterpart page table entry in the memory.

7. A computer program storage medium readable by a computing system and encoding a computer program of instructions for executing a computer process for identifying and correcting inconsistencies between cache and memory in a memory system operating with a computer processor, the memory system having a memory cache, a memory and a translation lookaside buffer, said computer process comprising the steps of:

cache checking a cache entry against a counterpart memory entry to trace inconsistencies between the cache entry and the memory entry and to correct the cache entry;

zero map checking a page table entry with a zero mapping mark in memory against a counterpart page entry in the translation lookaside buffer to trace inconsistencies between the page table entry with a zero mapping mark and the page entry in the translation lookaside buffer and to correct the page entry in the translation lookaside buffer;

address map checking a page entry in the translation lookaside buffer against a counterpart page table entry in the memory to trace inconsistencies between the page entry in the translation lookaside buffer and the page table entry in memory and to correct the page entry in the translation lookaside buffer, whereby inconsistencies in the cache, the memory and the translation lookaside buffer are traced and corrected.

8. The computer program storage medium of claim 7 where in the computer program the computer process step of cache checking comprises the steps of:

detecting a mismatch between a cache entry and a counterpart entry in memory;

tracing the mismatch detected by said detecting module;

correcting the cache entry and the counterpart entry in memory so that both entries match.

9. The computer program storage medium of claim 8 where in the computer program the computer process step of correcting comprises the steps of:

writing a cache entry marked with a dirty marker to a counterpart entry in memory, said dirty marker indicating the cache entry has not updated a counterpart entry in memory;

updating any duplicate cache entries not having a dirty marker and being duplicate entries for the cache entry marked with a dirty marker;

clearing the dirty marker from the cache entry marked with the dirty marker and any duplicate cache entries also marked with the dirty marker.

10. The computer program storage medium of claim 7 where in the computer program the computer process steps of cache checking, zero map checking and address map checking are operative in response to a memory access request.

11. The computer program storage medium of claim 10 where in the computer program the computer process step of zero map checking comprises the steps of:

detecting if there is a page entry in the translation lookaside buffer for the memory access request;

retrieving a counterpart page table entry in memory for the page entry in the translation lookaside buffer;

testing the counterpart page table entry for a valid mark and producing a zero mapping indicator for the counterpart page table entry if the valid mark is absent;

tracing the page entry and counterpart page table entry if said testing step produces the zero mapping indicator for the counterpart page table entry; and deleting the page entry if said testing step produces the zero mapping indicator for the counterpart page table entry.

12. The computer program storage medium of claim 11 where in the computer program the computer process step of address map checking comprises the steps of:

said testing step producing a valid mapping indicator if the valid mark for the counterpart page table entry is present;

in response to the valid mapping indicator from said testing step, comparing the page entry from the translation lookaside buffer to the counterpart page table entry in memory and providing a mismatch indication if the page entry does not match the counterpart page table entry;

in response to the mismatch indication, tracing the identification of the page entry and counterpart page table entry that do not match; and in response to the mismatch indication, updating the page entry in the translation lookaside buffer with the counterpart page table entry in the memory.

* * * * *